United States Patent [19]

Crawford

[11] Patent Number: 4,657,203

[45] Date of Patent: Apr. 14, 1987

[54] FIBER OPTIC CABLE REEL

[75] Inventor: Brian F. Crawford, Sand Lake, N.Y.

[73] Assignee: Crellin, Inc., Chatham, N.Y.

[21] Appl. No.: 788,077

[22] Filed: Oct. 16, 1985

[51] Int. Cl.$^4$ .............................................. B65H 75/28
[52] U.S. Cl. .................................. 242/125.1; 242/117; 242/118.4
[58] Field of Search ...................... 242/125.1, 125, 77, 242/77.3, 77.4, 118.4, 118.7, 118.8, 117

[56] References Cited

U.S. PATENT DOCUMENTS

| | | | |
|---|---|---|---|
| 1,533,556 | 4/1925 | Howard | 242/117 |
| 1,624,884 | 4/1927 | Barth | 242/118.4 |
| 1,985,742 | 12/1934 | Rea | 242/118.4 |
| 2,225,180 | 12/1940 | Olesen | 242/118.4 |
| 2,329,943 | 9/1943 | Robins | 242/117 |
| 2,393,733 | 1/1946 | Barrett | 242/118.4 |
| 2,465,573 | 3/1949 | Brannon | 242/118.4 |
| 2,501,596 | 3/1950 | Denny | 242/125.1 X |
| 3,784,166 | 1/1974 | Renfroe | 242/117 X |
| 4,387,863 | 6/1983 | Edmonston et al. | 242/118.4 |
| 4,451,013 | 5/1984 | Bedrosian | 242/118.4 |

Primary Examiner—Stanley N. Gilreath
Attorney, Agent, or Firm—Kane, Dalsimer, Kane, Sullivan & Kurucz

[57] ABSTRACT

A reel for optical fiber or cable includes a drum and a plurality of ribs positioned within said drum. The ribs are formed with notches for holding a cable end securely. The cable end may be removed from the ribs for testing purposes or connectorization without disturbing the cable wound on the reel drum.

8 Claims, 2 Drawing Figures

FIBER OPTIC CABLE REEL

BACKGROUND OF THE INVENTION

1. Field of Invention

This invention pertains to a reel for holding cable used for data communication, such as a fiber optic cable. It also applies to a reel for the packaging of fiber for use in cable, due to the similar care required in packaging.

2. Background of the Invention

Wire or fiber optic cables are frequently used to transmit data (and voice) communication signals between two remote locations. Since, in most instances it is difficult, if not impossible to manufacture a signal cable long enough to extend between two remote locations, such a cable is made of separate sections which are then spliced together. However, splices are expensive, they increase the noise level of the signal and generally reduce the reliability of the communication. Therefore, it is desirable to provide cable sections of large lengths.

It has been found that the most economical way to store and transport fiber or cable is by use of cable reels. Usually a cable reel comprises a central drum for holding a helically wound cable and two disk shaped ends for maintaining the cable on the drum. Frequently a depression or through-hole is made in the drum for securing the starting end before winding. Thus, slippage is eliminated while the cable is wound on the reel. In addition, the starting end may be used for inspection or testing purposes, and in the case of cable, a connector may be attached to the cable after winding.

Frequently the cable end has to be rather long (in the order of several feet to facilitate testing and/or connectorization). However with prior art reels, a long cable end was easily damaged during transit so that it could not be optically tested with satisfactory results. This problem was especially the case for very fragile materials such as glass fiber or fiber optic cable which are not made to withstand large mechanical strain or stress. Furthermore, a long cable end interfered with the stacking or rolling of the reels, which also were responsible for fiber/cable failure.

OBJECTIVES AND SUMMARY OF THE INVENTION

A principal objective of the present invention is to provide a cable reel which can be used to hold a fiber or cable with a relatively long end, without damaging said end.

A further objective is to provide a reel adapted to hold a relatively fragile material such as glass fiber or fiber optic cable.

Other advantages shall become apparent from the following description of the invention.

A cable reel, according to this invention comprises a cylindrical drum having an outer surface on a drum on which a cable may be wound, having an inner cavity, and a plurality of ribs disposed within said cavity and adapted to hold a cable end.

BRIEF DESCRIPTION OF THE INVENTION

FIG. 1 shows an exploded isometric view of a cable reel constructed in accordance with the invention; and
FIG. 2 shows a side sectional view of the reel along line 2—2 of FIG. 1.

DETAILED DESCRIPTION OF THE INVENTION

Figure 1:
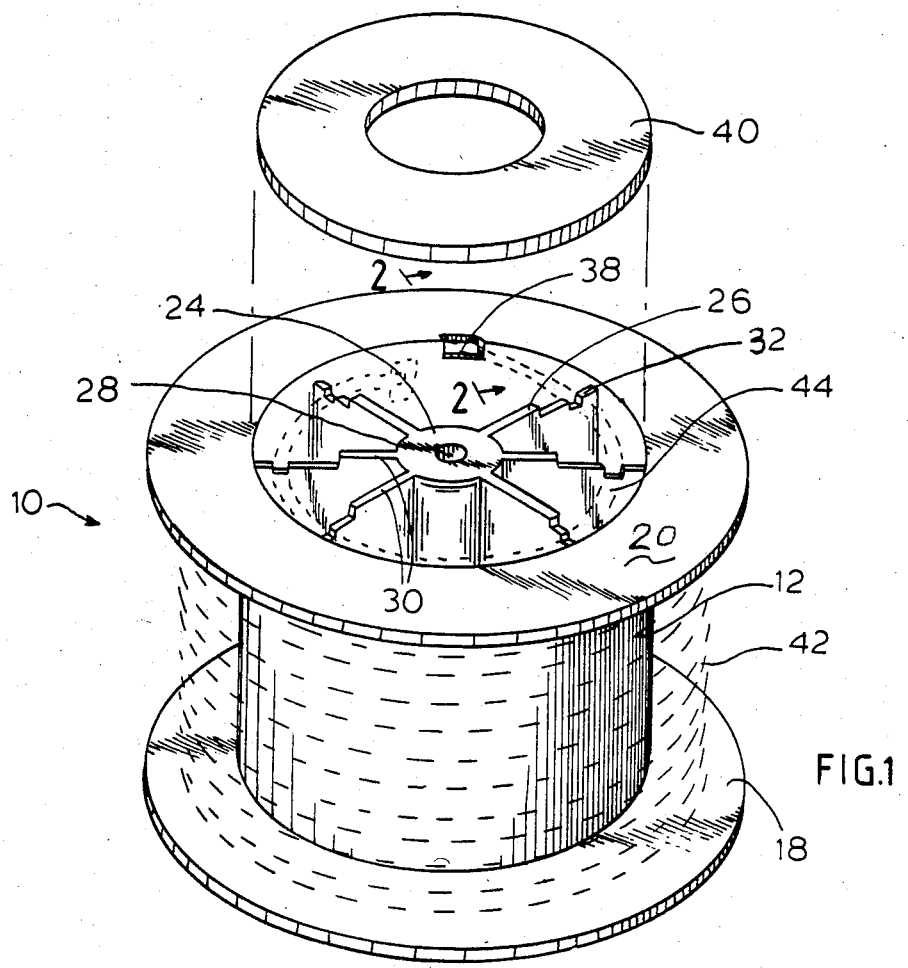

Referring now to the figures, a cable reel 10 constructed in accordance with this invention comprises a cylindrical drum 12 having an outer surface 14. The outer surface may be covered by a thin protective sheating 16, such as a resilient sponge sheet. The reel also has two disk-shaped walls 18 and 20 attached to the axial ends of the drum 12.

Drum 12 also has an axle 24 disposed at the axis of the drum 12 and a plurality of ribs 26. The ribs extend radially from axle 24 to connect said axle to drum 12, as shown. In FIG. 1 six ribs are shown separated by an angle of about 60°. Preferably each rib extends axially through the length of the drum, to reinforce the reel. However, it should be understood that for the purposes of this invention other configurations are equally suitable. Axle 24 may be provided with a central hole 28 by which the reel may be rotatably mounted in a support means (not shown) while the fiber or cable is wound or unwound from the reel.

Figure 2:
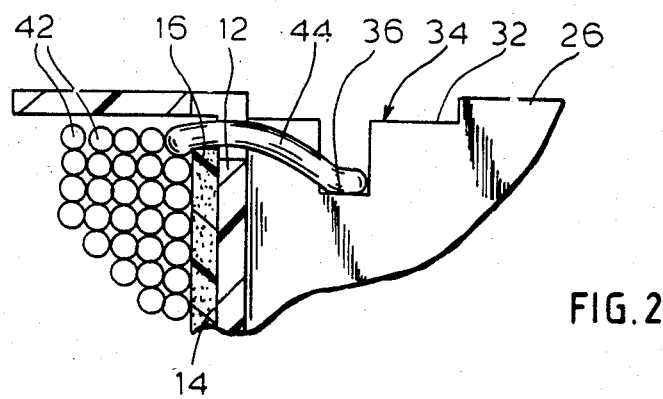

Each rib has a side edge or surface 30 which extends generally in the radial direction. At least some, and preferably all the rib edges 30 are provided with a cutout 32. As shown more clearly in FIG. 2, cutout 32 has a relatively shallow portion 34, disposed at about halfway along the length of the cutout, and a deeper notch 36. The notch 36 may have square, rectangular, or any other geometric shape. Preferably cutout 32 is positioned at the end of edge 30 adjacent to the respective sidewall.

Drum 12 is provided a through-hole 38. A disk-shaped cap 40 is provided to fit into cutout 32. Preferably the cutout 32 and cap 40 are dimensioned to create an interference fit therebetween, so that the cap can be snapped in and out of engagement with ribs 26. Preferably the cap 40 has substantially the same thickness as the depth of cutout 32 so that when it is in place, the cap and the remaining portions of the rib edges 30 are flush with the corresponding sidewall. Thus several reels may be stored or transported on top of each other in a stacked relationship.

A glass fiber or optic cable 42 of a preselected length is mounted on the reel as follows. First a leading end 44 is inserted via through-hole 38. This end 44 may be several feet in length. The remaining portion of the fiber or cable is then wound in a helix around the drum as shown. The sidewalls keep the cable material from slipping off the drum. The starting end 44 is stored in the notches 36 of cutout 32, and then the cap 40 is snapped into the shallow 34 portion of the cutout 32, thereby securing the starting end. Since the starting end is secured, it does not rub during transit and therefore its sheathing remains intact. In addition a connectorized cable end if secured will not receive stresses due to flexing.

The starting end is easily accessed at any time by removing the cap 40 and without disturbing the remainder of the cable wound on the drum. After testing or connectorization, the end may be reinserted into the notches, and the cap may be repositioned on the ribs.

Obviously, numerous modifications may be made to this invention without departing from the scope of the invention as defined in the appended claims.

What is claimed is:

1. A reel for holding a fiber or cable with a starting end comprising:

a. a drum having a cylindrical wall defining an outer surface and two opposed ends;
b. two opposed sidewalls connected to said ends to define with said outer surface an annular space for holding one of said fiber and cable;
c. a shaft disposed coaxially within said cylindrical wall;
d. a plurality of ribs connected to and extending between said shaft and said cylindrical wall, at least one of said ribs having a radial edge with a notch opening axially from said edge for holding said starting end.

2. The reel of claim 1 wherein said notch is closer to said cylindrical wall than to said shaft.

3. The reel of claim 1 further comprising a cap removably attached to said ribs for covering said notch.

4. The reel of claim 3 wherein all said ribs have a radial edge with a cutout and a notch, said notch opening into said cutout.

5. The reel of claim 4 wherein said cap has an annular shape.

6. The reel of claim 5 wherein said cap and cutout have substantially equal radial dimensions to form an interference fit therebetween.

7. The reel of claim 1 where said notches are disposed in a plane substantially perpendicular to said shaft.

8. The reel of claim 4 wherein said cutouts are disposed in a plane substantially perpendicular to said shaft.

* * * * *